(12) United States Patent
Parfenov et al.

(10) Patent No.: US 9,305,360 B2
(45) Date of Patent: Apr. 5, 2016

(54) METHOD AND APPARATUS FOR IMAGE ENHANCEMENT AND EDGE VERIFICATION USING AT LEAST ONE ADDITIONAL IMAGE

(71) Applicant: LSI Corporation, San Jose, CA (US)

(72) Inventors: Denis V. Parfenov, Moscow (RU); Denis V. Parkhomenko, Moscow (RU); Ivan L. Mazurenko, Moscow (RU); Denis V. Zaytsev, Moscow (RU); Dmitry N. Babin, Moscow (RU)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 76 days.

(21) Appl. No.: 14/238,327

(22) PCT Filed: Aug. 28, 2013

(86) PCT No.: PCT/US2013/057048
§ 371 (c)(1),
(2) Date: Feb. 11, 2014

(87) PCT Pub. No.: WO2014/126613
PCT Pub. Date: Aug. 21, 2014

(65) Prior Publication Data
US 2015/0206318 A1 Jul. 23, 2015

(30) Foreign Application Priority Data
Feb. 14, 2013 (RU) .................................. 2013106513

(51) Int. Cl.
*G06K 9/00* (2006.01)
*G06T 7/00* (2006.01)
(Continued)

(52) U.S. Cl.
CPC ............... *G06T 7/0085* (2013.01); *G06T 5/003* (2013.01); *G06T 5/50* (2013.01); *G06T 7/0075* (2013.01); *G06T 7/0097* (2013.01); *G06T 2200/04* (2013.01); *G06T 2207/10028* (2013.01)

(58) Field of Classification Search
CPC ................. G06T 2200/04; G06T 2207/10028; G06T 5/003; G06T 7/0085; G06T 7/0097
USPC .................................................. 382/154, 251
See application file for complete search history.

(56) References Cited

U.S. PATENT DOCUMENTS 8,310,583 B2 11/2012 Ohara et al.
8,339,484 B2 12/2012 Ishiga
(Continued)

FOREIGN PATENT DOCUMENTS

WO PCT/US2013/057048 3/2014

OTHER PUBLICATIONS

John Canny, "A Computational Approach to Edge Detection," IEEE Transactions on Pattern Analysis and Machine Intelligence, Nov. 1986, pp. 679-698, vol. 8, No. 6.
(Continued)

*Primary Examiner* — Manuchehr Rahmjoo

(57) ABSTRACT

An image processing system comprises an image processor configured to perform first and second edge detection operations on respective first and second images to obtain respective first and second edge images, to apply a joint edge weighting operation using edges from the first and second edge images, to generate an edge mask based on results of the edge weighting operation, to utilize the edge mask to obtain a third edge image, and to generate a third image based on the third edge image. By way of example only, in a given embodiment the first image may comprise a first depth image generated by a depth imager, the second image may comprise a two-dimensional image of substantially the same scene as the first image, and the third image may comprise an enhanced depth image having enhanced edge quality relative to the first depth image.

20 Claims, 3 Drawing Sheets

(51) Int. Cl.
*G06T 5/00* (2006.01)
*G06T 5/50* (2006.01)

(56) References Cited

U.S. PATENT DOCUMENTS

| 2011/0141237 | A1 | 6/2011 | Cheng et al. | |
|---|---|---|---|---|
| 2012/0200669 | A1 | 8/2012 | Lai et al. | |
| 2013/0011046 | A1* | 1/2013 | Choi et al. | 382/154 |
| 2013/0028524 | A1 | 1/2013 | Kondo et al. | |

OTHER PUBLICATIONS

R. Kimmel et al., "On Regularized Laplacian Zero Crossings and Other Optimal Edge Integrators," International Journal of Computer Vision, Jan. 2003, pp. 225-243, vol. 53, No. 3.

William K. Pratt, "Digital Image Processing," PIKS Inside, Third Edition, 2001, 738 pages.

S.-Y. Kim et al., "Generation of ROI Enhanced Depth Maps Using Stereoscopic Cameras and a Depth Camera," IEEE Transactions on Broadcasting, Dec. 2008, pp. 732-740, vol. 54, No. 4.

Q. Yang et al., "Spatial-Depth Super Resolution for Range Images," IEEE Conference on Computer Vision and Pattern Recognition (CVPR), Jun. 2007, 8 pages.

C. Dal Mutto et al., "Combined Use of TOF Sensors and Standard Cameras for 3D Video Acquisition," STreaming Day, Sep. 2009, 6 pages.

E.-K. Lee et al., "Generation of High-Quality Depth Maps Using Hybrid Camera System for 3-D Video," Journal of Visual Communication and Image Representation, Jan. 2011, pp. 73-84, vol. 22, No. 1.

J. Wu et al., "Improved 3D Depth Image Estimation Algorithm for Visual Camera," IEEE 2nd International Congress on Image and Signal Processing (CISP), Oct. 2009, 4 pages.

* cited by examiner

METHOD AND APPARATUS FOR IMAGE ENHANCEMENT AND EDGE VERIFICATION USING AT LEAST ONE ADDITIONAL IMAGE

FIELD

The field relates generally to image processing, and more particularly to processing of images such as depth maps and other types of depth images.

BACKGROUND

A wide variety of different techniques are known for detecting edges in images. Such techniques generally produce acceptable results when applied to high-resolution images, such as photographs or other two-dimensional (2D) images produced by a digital camera. However, many important machine vision applications utilize three-dimensional (3D) images generated by depth imagers such as structured light (SL) cameras or time of flight (ToF) cameras. These depth images are often low-resolution images and typically include highly noisy and blurred edges.

Conventional edge detection techniques generally do not perform well when applied to depth images. For example, these conventional techniques may either miss important edges in a given depth image or locate multiple spurious edges along with the important edges. The resulting detected edges are of poor quality and therefore undermine the effectiveness of subsequent image processing operations such as feature extraction, pattern identification, gesture recognition, object recognition and tracking.

SUMMARY

In one embodiment, an image processing system comprises an image processor configured to perform first and second edge detection operations on respective first and second images to obtain respective first and second edge images, to apply a joint edge weighting operation using edges from the first and second edge images, to generate an edge mask based on results of the edge weighting operation, to utilize the edge mask to obtain a third edge image, and to generate a third image based on the third edge image.

By way of example only, the first image in a given embodiment may comprise a first depth image generated by a depth imager, the second image may comprise a two-dimensional image of substantially the same scene as the first image, and the third image may comprise an enhanced depth image having enhanced edge quality relative to the first depth image.

Other embodiments of the invention include but are not limited to methods, apparatus, systems, processing devices, integrated circuits, and computer-readable storage media having computer program code embodied therein.

DETAILED DESCRIPTION

Embodiments of the invention will be illustrated herein in conjunction with exemplary image processing systems that include image processors or other types of processing devices and implement techniques for generating enhanced depth images with reliable edges. It should be understood, however, that embodiments of the invention are more generally applicable to any image processing system or associated device or technique that involves enhancing edge quality in one image by utilizing one or more additional images.

Figure 1:
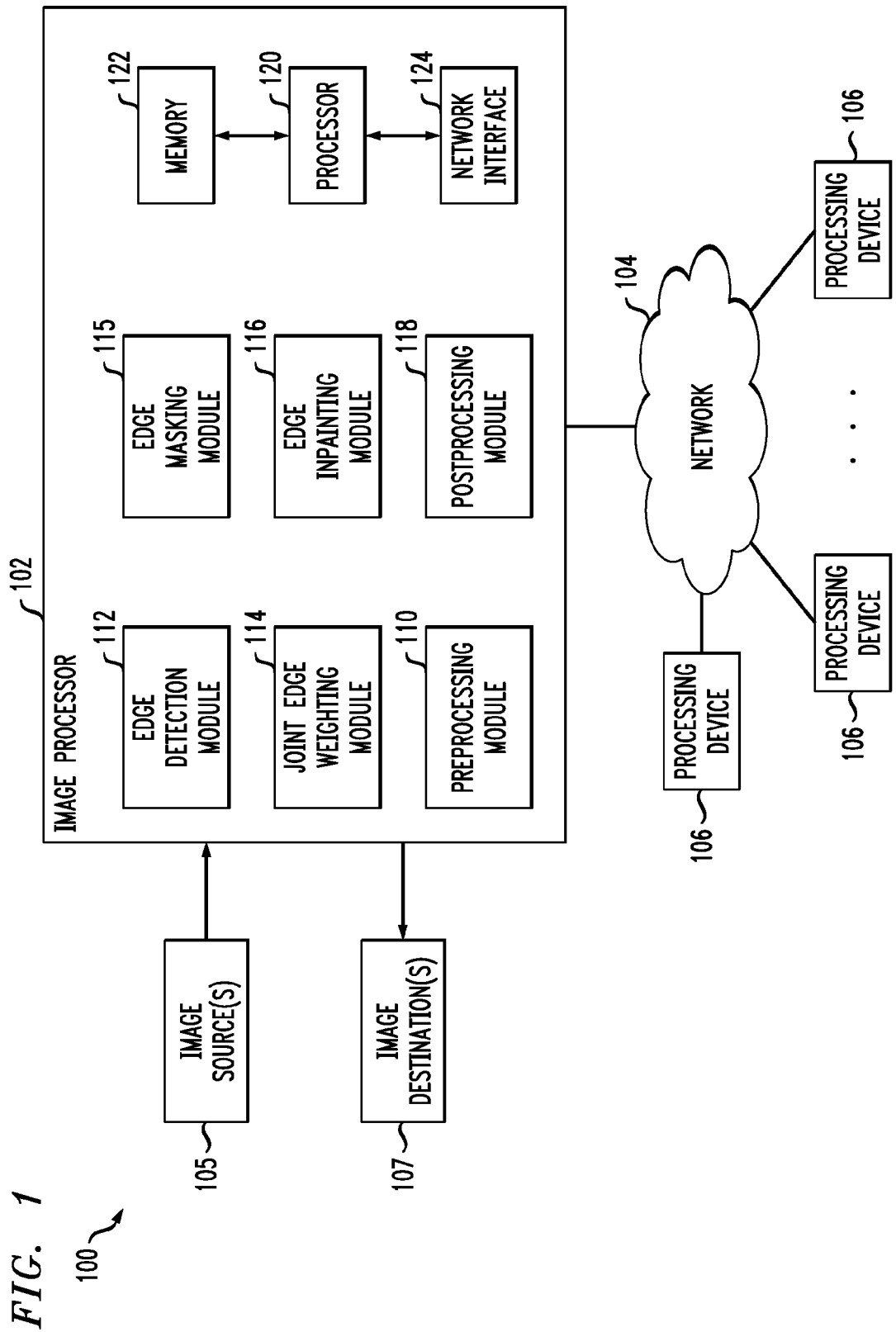
FIG. 1 is a block diagram of an image processing system comprising an image processor configured for image enhancement and edge verification in one embodiment.

FIG. 1 shows an image processing system 100 in an embodiment of the invention. The image processing system 100 comprises an image processor 102 that receives images from one or more image sources 105 and provides processed images to one or more image destinations 107. The image processor 102 also communicates over a network 104 with a plurality of processing devices 106.

Although the image source(s) 105 and image destination(s) 107 are shown as being separate from the processing devices 106 in FIG. 1, at least a subset of such sources and destinations may be implemented as least in part utilizing one or more of the processing devices 106. Accordingly, images may be provided to the image processor 102 over network 104 for processing from one or more of the processing devices 106. Similarly, processed images may be delivered by the image processor 102 over network 104 to one or more of the processing devices 106. Such processing devices may therefore be viewed as examples of image sources or image destinations.

A given image source may comprise, for example, a 3D imager such as an SL camera or a ToF camera configured to generate depth images, or a 2D imager configured to generate grayscale images, color images, infrared images or other types of 2D images. It is also possible that a single imager or other image source can provide both a depth image and a corresponding 2D image such as a grayscale image, a color image or an infrared image. For example, certain types of existing 3D cameras are able to produce a depth map of a given scene as well as a 2D image of the same scene. Alternatively, a 3D imager providing a depth map of a given scene can be arranged in proximity to a separate high-resolution video camera or other 2D imager providing a 2D image of substantially the same scene.

Another example of an image source is a storage device or server that provides images to the image processor 102 for processing.

A given image destination may comprise, for example, one or more display screens of a human-machine interface of a computer or mobile phone, or at least one storage device or server that receives processed images from the image processor 102.

Also, although the image source(s) 105 and image destination(s) 107 are shown as being separate from the image processor 102 in FIG. 1, the image processor 102 may be at least partially combined with at least a subset of the one or more image sources and the one or more image destinations on a common processing device. Thus, for example, a given image source and the image processor 102 may be collectively implemented on the same processing device. Similarly, a given image destination and the image processor 102 may be collectively implemented on the same processing device.

In the present embodiment, the image processor 102 is configured to perform first and second edge detection operations on respective first and second images to obtain respective first and second edge images, to apply a joint edge weighting operation using edges from the first and second edge images, to generate an edge mask based on results of the edge weighting operation, to utilize the edge mask to obtain a third edge image, and to generate a third image based on the third edge image.

The image processor 102 as illustrated in FIG. 1 includes a preprocessing module 110, an edge detection module 112, a joint edge weighting module 114, an edge masking module 115, an edge inpainting module 116 and a postprocessing module 118.

As one possible example of the above-noted first, second and third images, the first image in given embodiment may comprise a depth image generated by a depth imager such as an SL camera or a ToF camera, the second image may comprise a 2D image of substantially the same scene as the first image, and the third image may comprise an enhanced depth image having enhanced edge quality relative to the first depth image. It was indicated above that a single imager or other image source can provide both a depth image and a corresponding 2D image such as a grayscale image, a color image or an infrared image. Alternatively, the first and second images can be provided by separate 3D and 2D imagers, respectively. Also, multiple additional images may be used to enhance the first image, as opposed to use of only a second image in some embodiments. Other types and arrangements of images may be received, processed and generated in other embodiments.

The particular number and arrangement of modules shown in image processor 102 in the FIG. 1 embodiment can be varied in other embodiments. For example, in other embodiments two or more of these modules may be combined into a lesser number of modules. An otherwise conventional image processing integrated circuit or other type of image processing circuitry suitably modified to perform processing operations as disclosed herein may be used to implement at least a portion of one or more of the modules 110, 112, 114, 115, 116 and 118 of image processor 102. One possible example of image processing circuitry that may be used in one or more embodiments of the invention is an otherwise conventional graphics processor suitably reconfigured to perform functionality associated with one or more of the modules 110, 112, 114, 115, 116 and 118.

The operation of the image processor 102 will be described in greater detail below in conjunction with the flow diagram of FIG. 2. This flow diagram illustrates an exemplary process for image enhancement and edge verification using at least one additional image, in this case the above-noted second image comprising a 2D image of substantially the same scene as an input depth image.

The third image generated by image processor 102 comprises an enhanced depth image having enhanced edge quality relative to the input depth image. This enhanced depth image as generated by the image processor 102 may be subject to additional processing operations in the image processor 102, such as, for example, feature extraction, pattern identification, gesture recognition, object recognition and tracking.

Alternatively, an enhanced depth image as generated by the image processor 102 may be provided to one or more of the processing devices 106 over the network 104. One or more such processing devices may comprise respective image processors configured to perform the above-noted subsequent operations such as feature extraction, pattern identification, gesture recognition, object recognition and tracking.

The processing devices 106 may comprise, for example, computers, mobile phones, servers or storage devices, in any combination. One or more such devices also may include, for example, display screens or other user interfaces that are utilized to present images generated by the image processor 102. The processing devices 106 may therefore comprise a wide variety of different destination devices that receive processed image streams from the image processor 102 over the network 104, including by way of example at least one server or storage device that receives one or more processed image streams from the image processor 102.

Although shown as being separate from the processing devices 106 in the present embodiment, the image processor 102 may be at least partially combined with one or more of the processing devices 106. Thus, for example, the image processor 102 may be implemented at least in part using a given one of the processing devices 106. By way of example, a computer or mobile phone may be configured to incorporate the image processor 102 and possibly a given image source. The image source(s) 105 may therefore comprise cameras or other imagers associated with a computer, mobile phone or other processing device. As indicated previously, the image processor 102 may be at least partially combined with one or more image sources or image destinations on a common processing device.

The image processor 102 in the present embodiment is assumed to be implemented using at least one processing device and comprises a processor 120 coupled to a memory 122. The processor 120 executes software code stored in the memory 122 in order to control the performance of image processing operations. The image processor 102 also comprises a network interface 124 that supports communication over network 104.

The processor 120 may comprise, for example, a microprocessor, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of image processing circuitry, in any combination.

The memory 122 stores software code for execution by the processor 120 in implementing portions of the functionality of image processor 102, such as portions of modules 110, 112, 114, 115, 116 and 118. A given such memory that stores software code for execution by a corresponding processor is an example of what is more generally referred to herein as a computer-readable medium or other type of computer program product having computer program code embodied therein, and may comprise, for example, electronic memory such as random access memory (RAM) or read-only memory (ROM), magnetic memory, optical memory, or other types of storage devices in any combination. As indicated above, the processor may comprise portions or combinations of a microprocessor, ASIC, FPGA, CPU, ALU, DSP or other image processing circuitry.

It should also be appreciated that embodiments of the invention may be implemented in the form of integrated circuits. In a given such integrated circuit implementation, identical die are typically formed in a repeated pattern on a surface of a semiconductor wafer. Each die includes an image processor or other image processing circuitry as described herein, and may include other structures or circuits. The individual die are cut or diced from the wafer, then packaged as an integrated circuit. One skilled in the art would know how to dice wafers and package die to produce integrated circuits. Integrated circuits so manufactured are considered embodiments of the invention.

The particular configuration of image processing system 100 as shown in FIG. 1 is exemplary only, and the system 100 in other embodiments may include other elements in addition to or in place of those specifically shown, including one or more elements of a type commonly found in a conventional implementation of such a system.

For example, in some embodiments, the image processing system 100 is implemented as a video gaming system or other type of gesture-based system that processes image streams in order to recognize user gestures. The disclosed techniques can be similarly adapted for use in a wide variety of other systems requiring a gesture-based human-machine interface, and can also be applied to applications other than gesture recognition, such as machine vision systems in robotics and other industrial applications.

Figure 2:
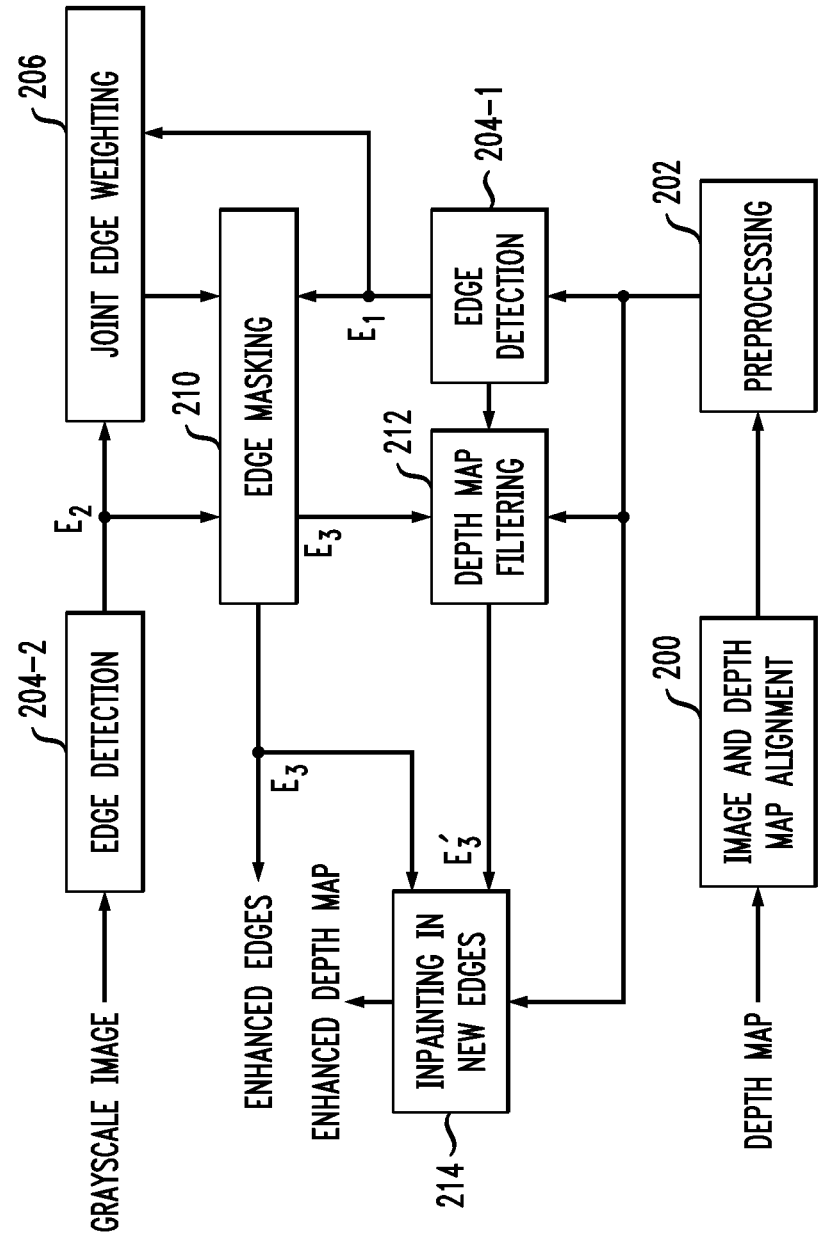
FIG. 2 is a flow diagram of an exemplary process for generating an enhanced depth image using a grayscale image in the image processor of the FIG. 1 system.

Referring now to FIG. 2, an exemplary process is shown for image enhancement and edge verification in the image processing system 100 of FIG. 1. The FIG. 2 process is assumed to be implemented by the image processor 102 using its preprocessing module 110, edge detection module 112, joint edge weighting module 114, edge masking module 115, edge inpainting module 116 and postprocessing module 118. The process in this embodiment includes steps 200 through 214.

It is assumed in this embodiment that the first and second images received in the image processor 102 from one or more image sources 105 comprise an input depth map and a grayscale image, respectively, and that the third image generated using the first and second images comprises an enhanced depth map.

The process to be described enhances depth map quality by taking edges that are sufficiently close to one another in both the input depth map and the grayscale image from the grayscale image rather than from the input depth map, because the grayscale image edges are generally better defined than the input depth map edges. Also, edges that are present in the grayscale image but not in the input depth map are eliminated from the enhanced depth map, and sufficiently strong edges that are present in the input depth map but not in the grayscale image are included in the enhanced depth map.

In step 200, the first and second images are aligned, assuming those images do not originate from a common image sensor. Also, in other embodiments, this alignment step 200 may be eliminated entirely.

As an example of one possible implementation of step 200 in an embodiment that includes such a step, if separate depth and 2D imagers are used to generate the respective first and second images, various types of alignment operations may be applied, such as affine transforms or other types of transforms.

More particularly, if the depth and 2D imagers are placed in substantially the same position, a simple linear transform with one scale coefficient to match resolution may be used. If the depth and 2D imagers are placed in different positions and both have no raster distortions, a 2D affine transform with 6 coefficients may be used. If the depth and 2D imagers are placed in different positions and the 3D imager has linear raster distortions depending on values along the z-axis, a 3D-to-2D linear transform with 8 coefficients may be used. Finally, if the depth and 2D imagers are placed in different positions and at least one has non-linear raster distortions, a non-linear corrector may be used, possibly in combination with a linear transform. Numerous other types and combinations of transforms or other alignment techniques may be used.

Assume by way of example that the resolution of the input depth map is $(d_x, d_y)$ and the resolution of the input grayscale image is $(g_x, g_y)$, and further assume that the depth map and grayscale image have the same aspect ratio, such that $d_x/g_x = d_y/g_y = k$, where k is a constant. If the depth map and grayscale image do not have the same aspect ratio, one of these images can be cut or the other extended along one dimension.

In the present embodiment, usually $k \leq 1$ because depth imagers such as SL or ToF cameras typically have significantly lower resolution than 2D imagers such as photo or video cameras. The aligned first and second images at the output of step 200 should have the same coordinate system and substantially the same resolution $(f_x, f_y)$, where $f_x/f_y = k$ and $d_x \leq f_x \leq g_x$. Accordingly, the alignment in step 200 may involve, for example, rescaling the 2D image: $(g_x, g_y) \rightarrow (f_x, f_y)$. As mentioned previously, the alignment may be eliminated, for example, in embodiments in which the depth map and grayscale image are provided by the same image sensor, or are otherwise already substantially aligned when supplied to the image processor 102 from the one or more image sources 105.

In step 202, preprocessing is applied to the aligned depth map. The preprocessing may involve operations such as, for example, denoising, equalization, etc. In other embodiments, the preprocessing may be applied prior to the alignment step 200. Also, preprocessing may additionally or alternatively be applied to the input grayscale image, or may be eliminated altogether.

In step 204-1, an edge detection operation is performed on the depth map in order to obtain a first edge image $E_1$.

In step 204-2, an edge detection operation is performed in the grayscale image in order to obtain a second edge image $E_2$.

Any of a wide variety of known edge detection techniques may be applied to generate the edge images $E_1$ and $E_2$ in steps 204-1 and 204-2. Examples of such edge detection techniques are disclosed in, for example, J. Canny, "A computational approach to edge detection," IEEE Transactions on Pattern Analysis and Machine Intelligence, Vol. PAMI-8, Issue 6, pp. 679-698, November 1986; R. Kimmel and A. M. Bruckstein, "On regularized Laplacian zero crossings and other optimal edge integrators," International Journal of Computer Vision, 53(3):225-243, 2003; and W. K. Pratt, Digital Image Processing, $3^{rd}$ Edition, John Wiley & Sons, 2001, which are incorporated by reference herein. In applying a given edge detection operation in step 204-1 or step 204-2, any associated edge detection threshold should be set sufficiently low so as to ensure retention of important edges, as the subsequent processing to be described will ensure rejection of unreliable edges. Also, different types of edge detection operations, potentially using different edge detection thresholds and other parameters, may be used in steps 104-1 and 104-2.

It should be noted that the term "image" as used herein is intended to be broadly construed, and in the context of the edge images $E_1$ and $E_2$ may comprise, for example, an edge map or other set of pixel information characterizing detected edges. The term "edge" is also intended to be broadly construed, so as to encompass, for example, a set of pixels in a given image that are associated with a transition between part of a periphery of an imaged object and other portions of the image.

In a given one of the edge images $E_1$ or $E_2$, edge pixels may be indicated with particular binary pixel values. Thus, an edge image pixel that is part of an edge has a binary value of "1" in the edge image while another edge image pixel that is not part of an edge has a binary value of "0" in the edge image. The terms "white" and "black" may also be used herein to denote respective edge and non-edge pixels of an edge image.

The edge detection techniques applied in steps 204-1 and 204-2 may involve techniques such as rejection of undersized edges, as well as various types of edge segmentation. For example, edge segmentation may be used to identify a plurality of distinct edge segments $ES_n$, n=1, ... N, where each pixel of a given edge segment corresponds to a particular pixel of one of the edge images $E_1$ or $E_2$, and all edges are assumed to be one pixel thick. Each such edge segment has a starting pixel $s_n$ and an ending pixel $e_n$, and may include filled or non-filled corner positions, or combinations thereof. Numerous other types of edge segments may be generated in steps 204-1 and 204-2. For example, edge segments in other embodiments may be more than one pixel in thickness.

In step 206, a joint edge weighting operation is applied using edges from the first and second edge images $E_1$ and $E_2$. The joint edge weighting operation in the present embodiment generally involves determining measures of closeness between edges in the first edge image $E_1$ and edges in the second edge image $E_2$.

For example, the joint edge weighting operation in the present embodiment may more particularly comprise defining a pixel vicinity, and for each of a plurality of edge pixels in one of the first and second edge images $E_1$ and $E_2$, determining a count of edge pixels of the other of the first and second edge images $E_1$ and $E_2$ that are within the defined vicinity of that edge pixel. The defined vicinity for a current one of the plurality of edge pixels in one of the first and second edge images may comprise all pixels within a specified radial distance of the current edge pixel, as will be described in greater detail below. Other types of distance measures may be used to define a given vicinity for purposes of joint edge weighting.

Typically, the second edge image $E_2$ derived from the input grayscale image will have much more reliable and well-defined edges than the first edge image $E_1$ derived from the input depth map. Accordingly, in the present embodiment, the above-noted determination of the counts of edge pixels may comprise determining, for each of the edge pixels of the second edge image $E_2$, a count of edge pixels of the first edge image $E_1$ that are within the defined vicinity of the edge pixel of the second edge image $E_2$. However, in other embodiments, the roles of the first and second edge images $E_1$ and $E_2$ in this exemplary joint edge weighting operation may be reversed.

Figure 3:
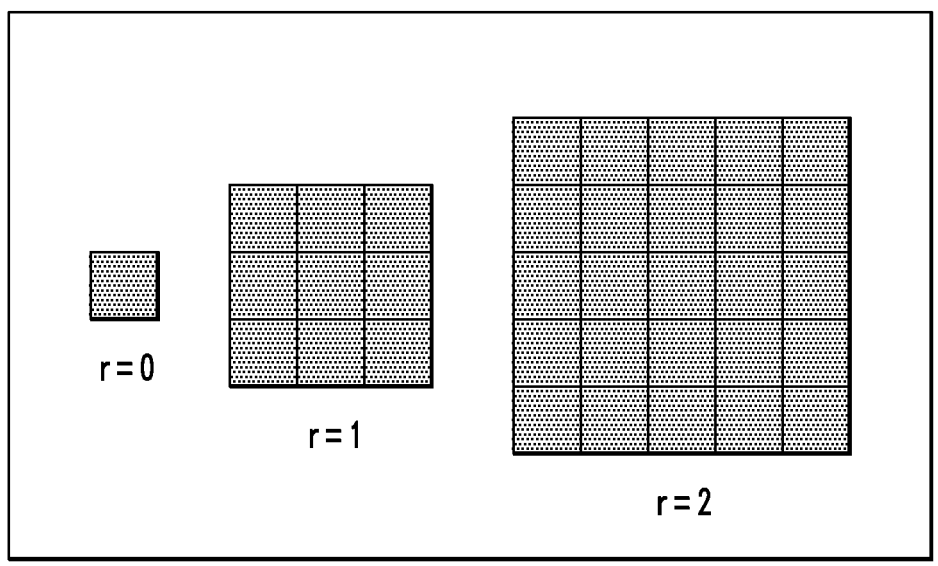
FIG. 3 illustrates different pixel vicinities that may be used in a joint edge weighting operation of the FIG. 2 process.

In the present embodiment, the vicinity is defined using a Manhattan distance metric, examples of which are shown in FIG. 3. Here, exemplary vicinities around a given pixel are shown for different values of vicinity radius r, where r denotes the maximal Manhattan distance from the given pixel to the perimeter of the vicinity. In the figure, the vicinities are shown for three different values of vicinity radius r, including a value of r=0 in which the vicinity consists of only the given pixel, a value of r=1 in which the vicinity consists of 8 pixels surrounding the given pixel, and a value of r=2 in which the vicinity consists of 24 pixels surrounding the given pixel. The size of the vicinity in this example increases exponentially with the vicinity radius r. Other values of the vicinity radius r can be used to define the vicinity in the context of the joint edge weighting operation. Also, as indicated above, other distance measures can be used, including Euclidean distance, chessboard distance, etc.

The edge pixels in the first edge image $E_1$ are the pixels for which $E_1(i,j)=1$, with all other pixels of $E_1$ being equal to 0. Similarly, the edge pixels in the second edge image $E_2$ are the pixels for which $E_2(i,j)=1$, with all other pixels of $E_2$ being equal to 0.

In a first example, the joint edge weighting operation in step 210 involves executing the following pseudocode for each edge pixel in $E_2$:

```
for (vote(i,j) = 0, r = 0; r <= r __max; r = r + 1)
    {
    consider vicinity of radius r around E₂(i,j)
    (which due to image alignment corresponds to E₁(i,j));
    if E₂(i,j) is closer to image border than r,
``` vicinity size can be smaller than $(1+2*r)^2$;
N = number of all $E_1(k,l) = 1$ that fall within this vicinity;
vote(i,j)=vote (i,j) + N * gamma$^r$; where gamma>1 is a predefined constant (for example gamma = 2 can be very efficiently implemented with operand arithmetical shifting in fixed-point number representation);
}

In a second example, the joint edge weighting operation in step 210 involves executing the following pseudocode:

```
for (i = 1, i ≤ f_x; i = i +1)
    for (j = 1, j ≤ f_y; j = j +1)
        dt(i,j)=gamma^(-distance_transform(E₁(i,j))*distance_transform(E₂(i,j))) ;
for (i = 1, i ≤ f_x; i = i +1)
    for (j = 1, j ≤ f_y; j = j +1)
    {
    consider vicinity of radius r around E₂(i,j) ;
    if E₂(i,j) is closer to image border than r,
    vicinity size can be smaller than (1+2*r)²;
    vote(i,j)=sum of all dt(l,k) over vicinity
    }
```

The second example above utilizes distance transforms to determine for each pixel in $E_2$ the distance to the nearest edge pixel in $E_1$ and vice versa.

In a third example, the joint edge weighting operation in step 210 involves executing the following pseudocode:

```
for (i = 1, i ≤ f_x; i = i +1)
    for (j = 1, j ≤ f_y; j = j +1)
        dt(i,j)=
distance_transform(E₁(i,j))*distance_transform(E₂(i,j));
for (i = 1, i ≤ f_x; i = i +1)
    for (j = 1, j ≤ f_y; j = j +1)
    {
    consider vicinity of radius r around E₂(i,j);
    if E₂(i,j) is closer to image border than r,
    vicinity size can be smaller than (1+2*r)²;
    vote(i,j)=number of pixels within the vicinity such that
dt(i,j)<threshold_d
    }
```

The value threshold$_d$ is an integer constant that is set as a parameter of the joint edge weighting operation.

The values vote(i,j) in the above pseudocode are examples of what are more generally referred to herein as "counts" of certain types of pixels in one edge image that fall within a vicinity of a particular pixel in another edge image. As noted previously, the vicinities are defined with respect to pixels in the second edge image $E_2$ in these examples, but in other embodiments the roles of $E_2$ and $E_1$ may be reversed, such that the vicinities are defined with respect to pixels in the first edge image $E_1$.

In step 210, an edge mask is generated based on results of the edge weighting operation performed in step 206. The edge mask is generated based at least in part using the above-described counts determined over respective pixel vicinities, and is applied to obtain a third edge image $E_3$. For example, the third edge image may be obtained in step 210 by pixel-wise application of the edge mask to the second edge image $E_2$ in accordance with the following equation:

$$E_3(i,j)=(E_2(i,j) \text{ and } \text{mask}(i,j)),$$

where $E_3(i,j)$ denotes a pixel of the third edge image, $E_2(i,j)$ denotes a pixel of the second edge image, and denotes a logical conjunction operator, and mask(i,j) denotes a pixel of the edge mask.

In this example, mask(i,j) is a binary value determined based on whether or not a corresponding count denoted vote (i,j) is greater than a specified threshold, where the count vote(i,j) denotes a count of edge pixels of the first edge image $E_1$ that are within a defined vicinity of pixel $E_2(i,j)$ of the second edge image, in accordance with a given one of the joint edge weighting examples described previously.

These counts indicate the closeness of edges in $E_2$ to edges in $E_1$. Edges in $E_2$ that do not have a sufficiently close counterpart in $E_1$ are considered unreliable edges not likely to be associated with actual object boundaries and are therefore eliminated by application of the edge mask. The edge masking process may be more particularly characterized as follows:

$$E_3(i,j)=(E_2(i,j) \text{ and vrai}(\text{vote}(i,j)>\text{threshold}_v)),$$

where threshold, is a positive constant, and vrai is a truth function providing binary output values vrai(true)=1 and vrai (false)=0. Smaller values of threshold, will tend to preserve more edges from $E_2$ that may not have close neighboring edges in $E_1$, while higher values of threshold, will lead to more strict verification of edges in $E_2$ using the edges in $E_1$. Other types of edge masking based on counts from the joint edge weighting operation in step 206 may be used in other embodiments.

The output third edge image $E_3$ of the edge masking step 210 represents a set of enhanced edges, as indicated in the figure. Each of these edges may have an associated confidence estimate that can be used in subsequent processing operations performed by the image processor 102. Generation of such confidence estimates is considered to be a type of "edge verification" as that term is broadly used herein. Also, inclusion in a given edge image of substantially only those edges having a designated reliability level is another example of edge verification as that term is used herein.

In step 212, an edge consolidation operation is performed using depth map filtering. The depth map filtering is shown in the figure as being illustratively applied to the third edge image $E_3$ in order to generate a modified third edge image $E_3'$. This operation involving depth map filtering in step 212 may be used to ensure that the resulting modified third edge image $E_3'$ includes strong edges from $E_1$ that have no counterparts in $E_2$, which can occur in situations in which the input grayscale image includes equal grayscale brightness objects that are located at different distances from the imager. As one example, an edge consolidation operation may be applied to the third edge image $E_3$ as follows:

$$E_3'(i,j)=(E_3(i,j) \text{ or } (\text{vrai}(\text{vote}(i,j)<\text{threshold}_c) \text{ and edge\_importance}(D(i,j))>\text{threshold}_i))),$$

where $D(i,j)$ denotes a pixel of the aligned and preprocessed input depth map, or denotes a logical disjunction operator, threshold, is a relatively small threshold that ensures that no double edges will occur, and threshold; is a relatively large threshold that guarantees that strong edges from $E_1$ will be included in $E_3'$.

The function edge_importance above can be defined in a variety of different ways. For example, this function may be illustratively defined as gradient magnitude smoothed with a 2D Gaussian low-pass filter LPF(·):

$$\text{edge\_importance}(D) = \text{thinning}(LPF(\sqrt{(\partial D/\partial x)^2 + (\partial D/\partial y)^2})),$$

where the function thinning(·) makes the edge one-pixel thick. Numerous other functions can be used to define importance of particular edges in the input depth map D for use in edge consolidation by depth map filtering in step 212. The edge image output of the edge detection operation in step 204-1 may be utilized in the depth map filtering step 212, as indicated in the figure.

In step 214, an edge inpainting operation is performed using edges from the third edge image $E_3$ or modified third edge image $E_3'$ in order to generate an enhanced depth map that has enhanced edge quality relative to the input depth map. The edge image $E_3$ and edge image $E_3'$ are both considered examples of what are more generally referred to herein as "third edge images." In the examples below, the edge inpainting is applied using edges from $E_3$, but it could instead be applied using edges from $E_3'$.

It is assumed that inside the areas bounded by reliable edges of $E_3$, depth does not change abruptly as a function of (x,y) position. Accordingly, step 214 may involve, for example, application of a 2D smoothing filter to portions of the aligned and preprocessed input depth map that lie inside boundaries defined by edges of $E_3$. These and other types of edge inpainting applied in step 214 can be used to suppress noise such as speckle noise in the interior of imaged objects in the depth map, as well as to remove other singularities and to fill uniformly ill-defined areas near the edges.

An exemplary edge inpainting operation that is computationally inexpensive includes the following steps:

1. Exclude depth map pixels having unreliable depth values near edges in $E_3$. This may involve, for example, eliminating all depth map pixels for which $$\text{distance\_transform}(E_3(i,j)) < \text{reliability\_threshold},$$

where reliability_threshold is a constant that determines how near a depth map pixel must be to an edge in $E_3$ in order to be considered reliable. This parameter is relatively scene-independent and can be optimized for given type of depth imager.

2. Inpaint vacancies created by step 1 using depth values from adjacent reliable pixels on the same side of a given edge. For example, a median filtering approach may be used, in which each excluded pixel from step 1 is assigned a depth value given by the median depth value of multiple adjacent reliable pixels on the same side of the corresponding edge.

3. Apply a smoothing filter to the inpainted areas. For example, a sliding 2D square-shaped short-support median filter covering $M^2$ pixels at a time may be used. If a portion of a filtered area of $M^2$ pixels overlaps with an edge, the corresponding depth values are not utilized in the filtering.

The above edge inpainting process may be repeated as necessary to address any remaining edge pixels that do not have assigned depth values. For example, a localized 3×3 2D median filter may be used for this purpose. In certain applications such as gesture recognition in which vacant edge pixels are not problematic, this additional repetition of the edge inpainting process may be eliminated. Also, other types of edge inpainting operations may be used in other embodiments, or edge inpainting may be eliminated altogether.

The FIG. 2 process can be pipelined in a straightforward manner. For example, at least a portion of the steps can be performed in parallel, thereby reducing the overall latency of the process for a given input depth map and grayscale image, and facilitating implementation of the described techniques in real-time image processing applications.

The enhanced depth map generated at the output of step 214 may be further processed in the image processor 102, or supplied to another processing device 106 or image destination 107, as mentioned previously.

It is to be appreciated that the particular process steps used in the embodiment of FIG. 2 are exemplary only, and other embodiments can utilize different types and arrangements of image processing operations. For example, the particular manner in which edges of a given image are enhanced, and a modified image comprising the enhanced edges is generated, can be varied in other embodiments. Also, as noted above, steps indicated as being performed serially in the figure can be performed at least in part in parallel with one or more other steps in other embodiments. The particular steps and their interconnection as illustrated in FIG. 2 should therefore be viewed as one possible arrangement of process steps in one embodiment, and other embodiments may include additional or alternative process steps arranged in different processing orders.

Embodiments of the invention provide particularly efficient techniques for image enhancement and edge verification using one or more additional images. For example, the disclosed techniques can provide significantly improved edge images relative to conventional edge detection techniques that generally produce poor quality detected edges particularly for certain types of images such as depth images from SL or ToF cameras or other types of depth imagers. Moreover, images having reliable edges are provided using the techniques disclosed herein without the cost and complexity of excessive parameter tuning that is often required for conventional edge detection operations.

Accordingly, enhanced depth maps and other types of images having reliable edges as generated in embodiments of the invention can significantly enhance the effectiveness of subsequent image processing operations that utilize such edges, including, for example, feature extraction, pattern identification, gesture recognition, object recognition and tracking.

It should again be emphasized that the embodiments of the invention as described herein are intended to be illustrative only. For example, other embodiments of the invention can be implemented utilizing a wide variety of different types and arrangements of image processing circuitry, modules and processing operations than those utilized in the particular embodiments described herein. In addition, the particular assumptions made herein in the context of describing certain embodiments need not apply in other embodiments. These and numerous other alternative embodiments within the scope of the following claims will be readily apparent to those skilled in the art.

What is claimed is:

1. A method comprising:
performing first and second edge detection operations on respective first and second images to obtain respective first and second edge images;
applying a joint edge weighting operation using edges from the first and second edge images including determining an edge image of the first and second edge images to have higher resolution than another edge image of the first and second edge images and determining a metric with respect to the edge image with higher resolution;
generating an edge mask based on results of the joint edge weighting operation including retaining or eliminating one or more edge pixels of the respective edge image of the first and second edge images as the one or more edge pixels retained or eliminated are determined to be respectively within or outside the metric;
utilizing the edge mask to obtain a third edge image; and
generating a third image based on the third edge image;
wherein said performing the first and second edge detection operations, applying the joint edge weighting operation, generating the edge mask, utilizing the edge mask and generating the third image are implemented in at least one processing device comprising a processor coupled to a memory.

2. The method of claim 1, wherein the metric comprises a distance from an edge pixel of the edge image with higher resolution than the other edge image to an edge pixel of the other edge image, and wherein the first image comprises a first depth image of a scene generated by a depth imager.

3. The method of claim 2, wherein the second image comprises a two-dimensional image of substantially a same scene as the first image.

4. The method of claim 3, wherein the third image comprises an enhanced depth image having enhanced edge quality relative to the first depth image.

5. The method of claim 1, wherein the second edge image is the edge image with higher resolution than the other edge image of the first and second edge images and the first edge image has a higher number of dimensions than the second edge image, and wherein utilizing the edge mask to obtain the third edge image comprises:
deriving a first one or more edges of the third edge image from an edge of the first edge image that appears in close proximity to an edge of the second edge image of the first and second edge images, wherein a determination of close proximity is based upon the metric;
deriving a second one or more edges of the third edge image from a third edge that only appears in the first edge image; and
removing edges of the second edge image that only appear in the second edge image,
wherein the first one or more edges only include one or more edges that appear in both the first edge image and the second edge image.

6. The method of claim 1, wherein the joint edge weighting operation determines measures of closeness between edges in the first edge image and edges in the second edge image based upon the metric.

7. The method of claim 1, wherein the second edge image is the edge image with the higher resolution than the other edge image of the first and second edge images, wherein a first plurality of edge pixels includes the pixel of the edge image with higher resolution than the other edge image of the first and second edge images, and wherein the joint edge weighting operation comprises:
defining a pixel vicinity for each edge pixel of the first plurality of edge pixels based upon the metric; and
determining a count of each edge pixel of a second plurality of edge pixels that are within the defined vicinity of each respective edge pixel of the first plurality of edge pixels, and
wherein the edge mask is generated based at least in part on the count for each respective edge pixel of the first plurality of edge pixels.

8. The method of claim 7, wherein the defined vicinity for a respective edge pixel of the first plurality of edge pixels is determined with respect to a specified radial distance of the respective edge pixel.

9. The method of claim 7, wherein the determining the count of each edge pixel of the second plurality of edge pixels comprises determining all pixels of the second plurality of edge pixels that are within the defined vicinity of a respective edge pixel of the second edge image.

10. The method of claim 1, wherein the second edge image is the edge image with the higher resolution than the other edge image of the first and second edge images, and wherein utilizing the edge mask to obtain the third edge image comprises a pixel-wise application of the edge mask to the second edge image in accordance with the following equation:

$$E_3(i,j) = (E_2(i,j) \text{ and } \text{mask}(i,j))$$

where $E_3(i,j)$ denotes a pixel of the third edge image, $E_2(i,j)$ denotes a pixel of the second edge image, the term "and" denotes a logical operator and mask(i,j) denotes a pixel of the edge mask.

11. The method of claim 10, wherein mask(i,j) is a binary value determined based on a count vote(i,j) being greater or less than a specified threshold, where the count vote(i,j) comprises a count of edge pixels of the first edge image that are within a defined vicinity of pixel $E_2(i,j)$ of the second edge image.

12. The method of claim 1, further comprising performing an edge consolidation operation on the third edge image.

13. The method of claim 1, wherein the first edge image is an edge image of the first and second edge images with a higher number of dimensions than the other edge image of the first and second edge images, and wherein generating the third image further comprises performing an edge inpainting operation on portions of the first edge image bounded by edges in the third edge image.

14. A non-transitory computer readable storage medium having computer program code embodied therein, wherein the computer program code when executed in the processing device causes the processing device to perform the method of claim 1.

15. An apparatus comprising:
at least one processing device comprising a processor coupled to a memory, wherein said at least one processing device is configured to:
perform first and second edge detection operations on respective first and second images to obtain respective first and second edge images;
apply a joint edge weighting operation using edges from the first and second edge images including determining an edge image of the first and second edge images to have higher resolution than another edge image of the first and second edge images and determining a metric with respect to the edge image with higher resolution;
generate an edge mask based on results of the joint edge weighting operation including retaining or eliminating one or more edge pixels of the respective edge image of the first and second edge images as the one or more edge pixels retained or eliminated are determined to be respectively within or outside the metric;
utilize the edge mask to obtain a third edge image; and
generate a third image based on the third edge image.

16. The apparatus of claim 15, wherein the processing device comprises an image processor, the image processor comprising:
an edge detection module configured to perform the first and second edge detection operations;
a joint edge weighting module configured to perform the joint edge weighting operation; and
an edge masking module configured to generate the edge mask based on the results of the edge weighting operation;
wherein said modules are implemented using image processing circuitry comprising at least one graphics processor of the image processor.

17. The apparatus of claim 15, wherein the image processor further comprises an edge inpainting module configured to perform an edge inpainting operation on edges of the third edge image in conjunction with generation of the third image.

18. An integrated circuit comprising the apparatus of claim 15.

19. An image processing system comprising:
one or more image sources providing first and second images;
one or more image destinations; and
an image processor coupled between said one or more image sources and said one or more image destinations, wherein the image processor is configured to:
perform first and second edge detection operations on respective first and second images to obtain respective first and second edge images;
apply a joint edge weighting operation using edges from the first and second edge images, the joint edge weighting operation comprising determining an edge image of the first and second edge images to have higher resolution than another edge image of the first and second edge images and determining a metric with respect to the edge image with higher resolution;
generate an edge mask based on results of the joint edge weighting operation, the edge mask retaining or eliminating one or more edge pixels of the respective edge image of the first and second edge images as the one or more edge pixels retained or eliminated are determined to be respectively within or outside the metric;
utilize the edge mask to obtain a third edge image; and
generate a third image based on the third edge image.

20. The system of claim 19, wherein at least one of the one or more image sources comprises a camera.

* * * * *